July 14, 1936.  R. W. THOMAS  2,047,339
CONSUMER'S LIQUEFIED PETROLEUM GAS STORAGE AND UTILIZATION EQUIPMENT
Filed Oct. 19, 1934  5 Sheets-Sheet 4

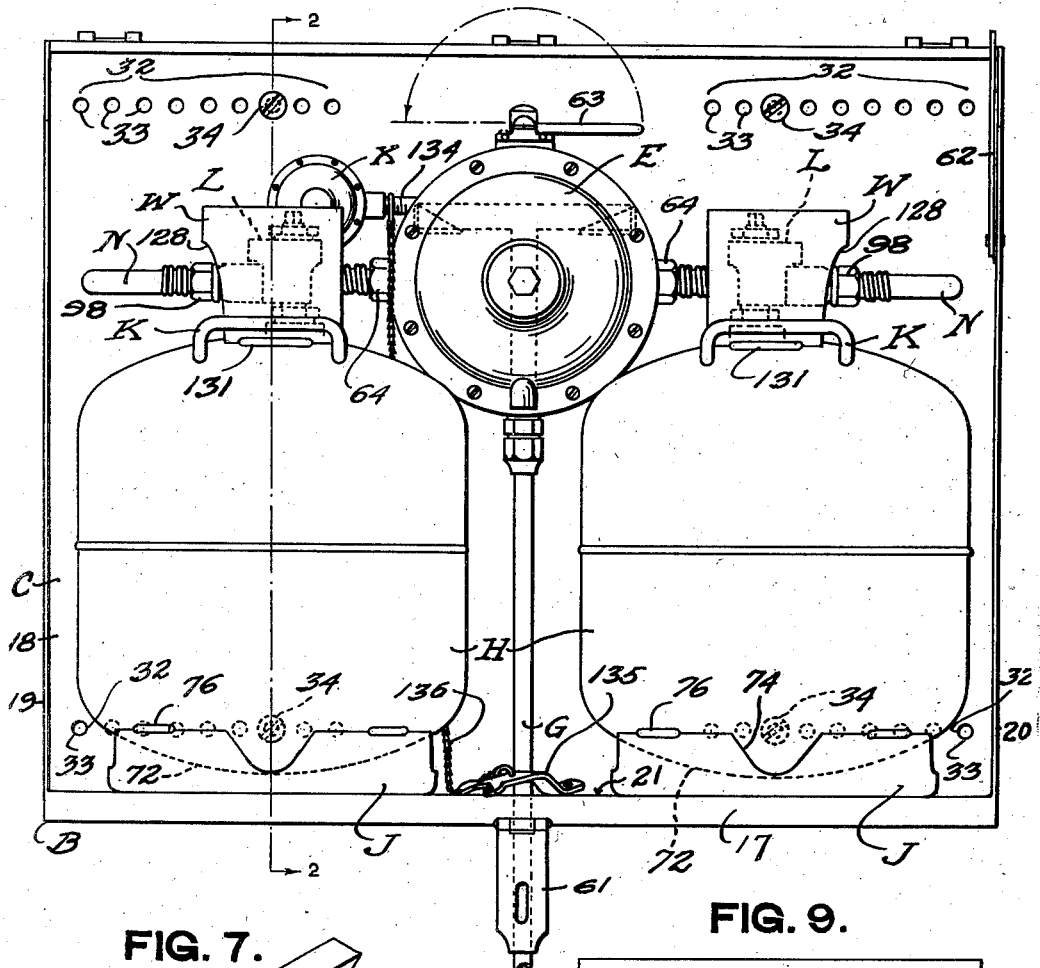

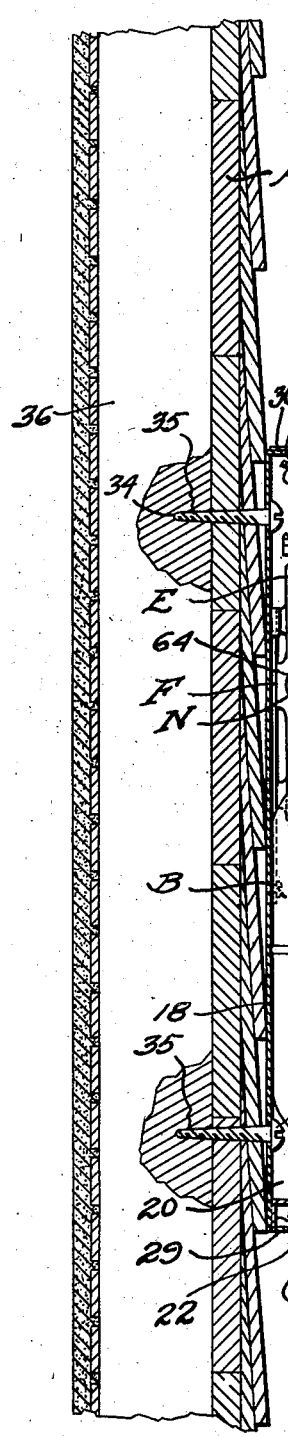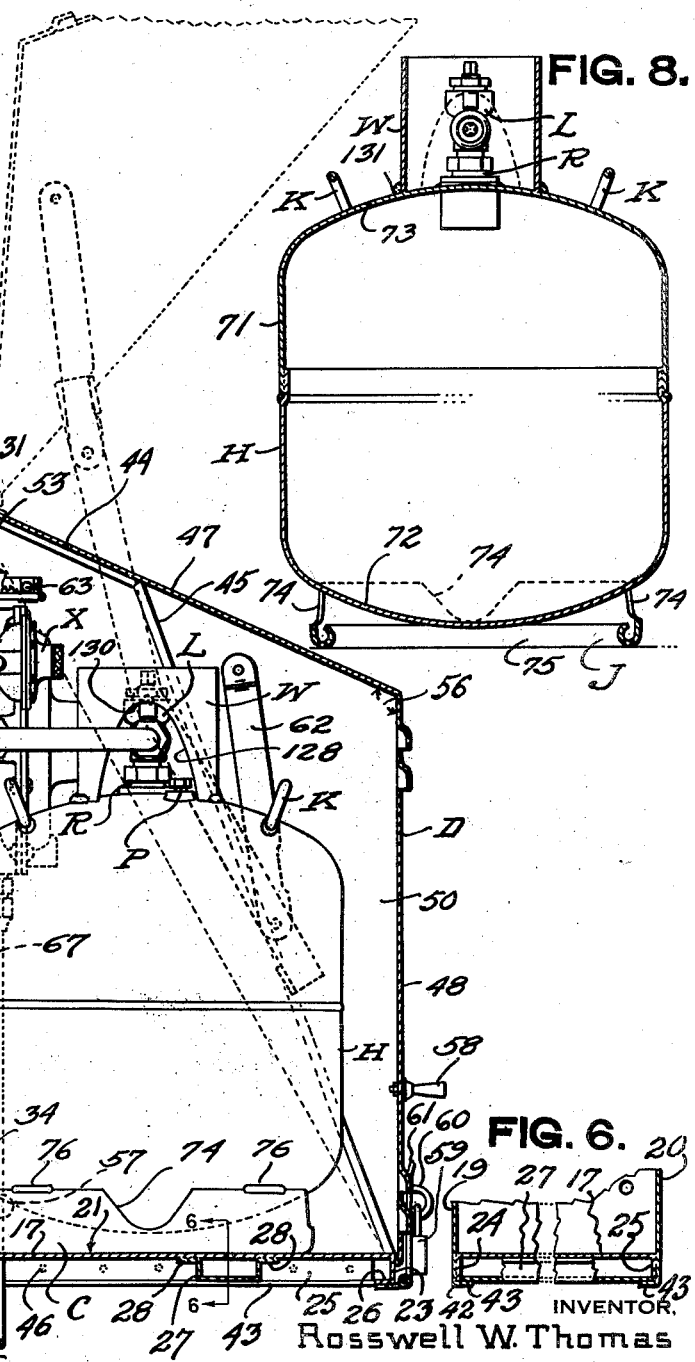

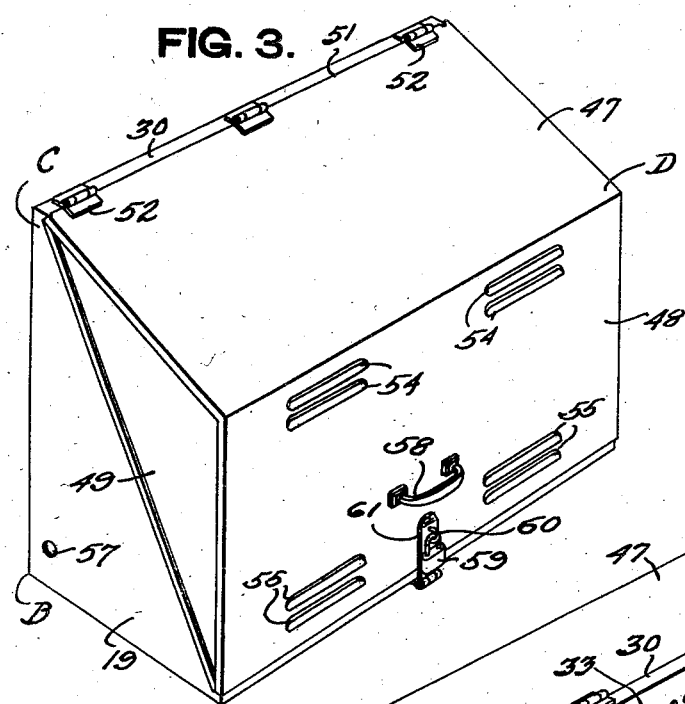
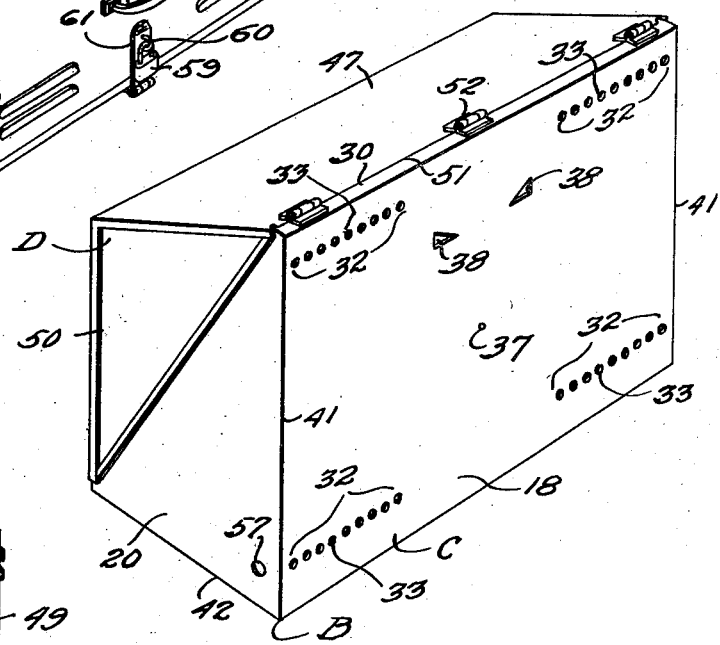
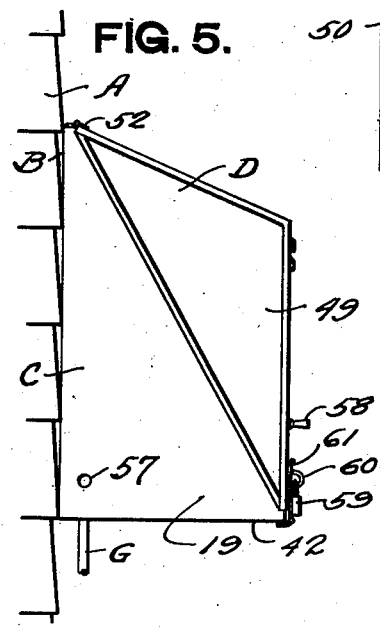

INVENTOR.
Rosswell W. Thomas
BY
ATTORNEYS.

July 14, 1936.    R. W. THOMAS    2,047,339
CONSUMER'S LIQUEFIED PETROLEUM GAS STORAGE AND UTILIZATION EQUIPMENT
Filed Oct. 19, 1934    5 Sheets—Sheet 5

INVENTOR.
Rosswell W. Thomas
BY Lancaster, Allwine and Rommel
ATTORNEYS.

Patented July 14, 1936

2,047,339

UNITED STATES PATENT OFFICE 2,047,339

CONSUMER'S LIQUEFIED PETROLEUM GAS STORAGE AND UTILIZATION EQUIPMENT

Rosswell W. Thomas, Detroit, Mich., assignor to Phillips Petroleum Company, Bartlesville, Okla., a corporation of Delaware Application October 19, 1934, Serial No. 749,124

9 Claims. (Cl. 221—73.5)

This invention relates to equipment for the storage and utilization of liquefied petroleum gas, and more particularly to equipment well adapted for use by the consumers of propane and similar petroleum products used for heating, lighting and cooking purposes in and about the home.

The equipment is also particularly well adapted, altho not necessarily limited to use where the consumer looks after the transportation of filled tanks or cylinders of liquefied gas from the store or service station to his premises and the return of empty tanks or cylinders as by use of the family automobile as while on other errands to the neighborhood of the store or service station. With this in view, the equipment is made so that the parts which the consumer must transport and operate are not heavy and complicated, otherwise the equipment would require the attention of a strong person of such a mechanical turn of mind as to limit use of the equipment to a small proportion of the population in rural communities where it is impractical for the vendor of liquefied petroleum gas to make deliveries and have experienced service men to condition the equipment for use each time a tank or cylinder becomes empty.

In general, one of the principal objects of the invention is to provide consumer's storage and utilization equipment which is simple and inexpensive to make and install, and safe for domestic purposes where the attendant may be merely the ordinary prudent householder who gives such attention to equipment as may reasonably be expected of a person whose other duties make it quite improbable that he will make a close study of all of the details of the equipment.

Another object of the invention is to provide a control unit for tanks or cylinders containing liquefied petroleum gas, such as propane, adapted for connection to the service line, as through a pressure reducing regulator, which control unit includes at least a manually operable valve for normal control of exit of the vapor to the service line, and a leakage prevention valve, to prevent escape of vapor to the atmosphere when the manually operable valve is open and the unit is disconnected from the service line, the unit having means whereby it may be quickly and conveniently attached to the tank in a fluid tight manner.

A further object is to provide such a control unit including an excess flow check device functioning to prevent rapid exit of vapor from the tank in the event that the service line becomes ruptured or a portion of the control unit becomes broken off or injured at a zone above such excess flow check device.

A still further object is to provide as a part of the control unit a seal which normally closes or seals the egress opening of the device thereby preventing the entrance of dirt and moisture while the tank is in storage or being transported, and discouraging tampering with parts of the control unit which are for safety purposes. Such seals may be of the character ordinarily used on bottles and having a crimped circumferential flange which engages in a groove of the main body portion of the control unit, or any approved type of cap or seal.

Another object of the invention is to provide an improved tank or cylinder for liquefied petroleum gas, which may be easily transported, stored and handled with comparative ease and safety, and including control means at its head, such as a safety valve to permit the escape of fluid or gas should the internal pressure approach a dangerous condition, a manually operable valve for normal control of exit of fluid or vapor, a leakage prevention valve to check egress of fluid from the tank when it is not connected to the service line, and an excess flow check device functioning to prevent too rapid exit of the fluid should the service line break, all of the control means being protected by a simple yet efficient sleeve so shaped and mounted as to permit access to parts of the control means requiring adjustment and yet guarding the same against injury incident to the transportation and use of the tank or cylinder, and which sleeve is self-cleaning or draining so as to prevent the accumulation of dirt, and water about the control means.

Other objects and advantages of the invention will appear in the following detailed description, taken in connection with the accompanying drawings, forming a part of this specification, and in which drawings:—

Figure 1 is a view in front elevation of the equipment, the combination door and lid of the cabinet being removed.

Figure 2 is a view partly in elevation and partly in vertical transverse section through the cabinet of the equipment,—the cabinet disclosed as attached to the wall of a building.

Figure 3 is a perspective view of the cabinet looking toward the top, front and side.

Figure 4 is a similar view looking toward the rear, top and side.

Figure 5 is a view in elevation of the cabinet attached to a wall portion.

Figure 6 is a fragmentary vertical sectional view on the line 6—6 of Figure 2.

Figure 7 is a fragmentary perspective view of a portion of the rear wall of the cabinet and a support for a pressure reducing regulator in a position about to be supported by the cabinet wall.

Figure 8 is a view partly in elevation and partly in central vertical section through one of the tanks or cylinders.

Figure 9 is an enlarged developed view of a portion of a protecting sleeve adapted for attachment to the tank or cylinder.

Figure 10:
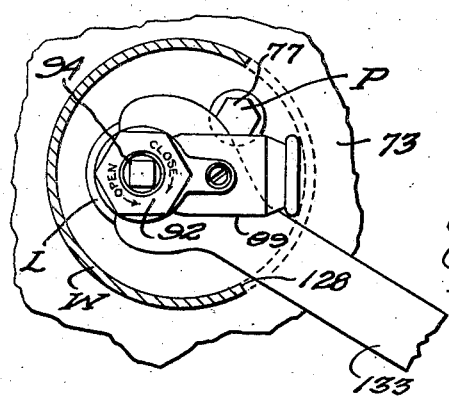
Figure 10 is a detail view partly in plan and partly in horizontal section showing the relationship of a control unit and its protecting sleeve, on the upper portion of the tank.

In the drawings, wherein like characters designate like or corresponding parts throughout the views, A designates a suitable upright to which is secured a cabinet B including a main body C and a combination door or lid D, preferably made of sheet metal; E a fluid pressure reducing regulator secured in the cabinet by means F and having a service line G connected to the outlet port of the regulator and extending to the consumer's gas utilization equipment, not shown in the drawings; H a tank or cylinder for liquefied petroleum gas, two of which may be accommodated in the cabinet B, in the example shown, each tank preferably including a base J to rest upon the bottom of the cabinet body, and handles K to facilitate movement of the tank from one place to another; L a control unit for each tank H including a manually operable valve M for normal control of exit of vapor to the regulator E, as through a conduit N, and a leakage prevention valve O, to prevent escape of vapor to the atmosphere under abnormal conditions; P a safety device which may be associated with the tank or the control unit L to permit escape of vapor from the tank in the event the pressure therein becomes abnormal; Q an excess flow check device which may be associated with the control unit L; R a union or swivel type base for connection of the control unit L to the tank H; S a cap or seal which may be associated with the outlet of the control unit, when not connected to the conduit N; W a protecting sleeve about the control unit L secured to the tank H; and X a pressure relief valve associated with the regulator E.

Referring first to the cabinet B, the body C thereof comprises a bottom 17, a rear wall 18, and side walls 19 and 20. In the example shown, the bottom 17 is rectangular in plan and of a length to accommodate two tanks or cylinders H as shown in Figure 1. It may include a floor 21; downwardly extending vertical flanges 22 and 23 at its rear and front margins, respectively, and similarly extending flanges 24 and 25 at its side margins; a rearwardly extending horizontal flange 26 at the bottom of flange 23; and a longitudinally extending beam 27 secured to the under side of floor 21. This preferred construction provides a very sturdy cabinet bottom, the front marginal portion of which is strengthened by the flanges 23 and 26 and providing no obstruction over which the tank H must be lifted in order to settle same upon the floor 21. The beam 27 may be a rolled U-section having outwardly extending horizontal flanges 27 at its upper portion, preferably welded or otherwise secured to the floor 21. The rear wall 18 includes a forwardly extending horizontal flange 29 at its lower margin upon which the flange 22 may rest; a forwardly extending flange 30 at its upper margin; and, a downwardly extending flange 31 along the forward margin of flange 30. The rear wall 18 is preferably provided with two or more series 32 of spaced apart perforations 33, each series of perforations extending in a general line parallel to the longitudinal axis of the cabinet adjacent the end walls. In the example shown, four such series 32 of perforations 33 are provided, two being adjacent the upper margin or rear wall 18 and two adjacent the lower margin thereof. The perforations 33 of each series are spaced apart a suitable distance in order a lag screw 34 may have its shank 35 extended through the selected perforation and into the support A which may include a number of upright studs 36. The spacing of studs in various buildings or types of buildings varies, so that by pounding upon the wall surface the location of the studs may be determined and the lag screws passed through the selected perforations 33 according to the spacing of the studs. This enables the cabinet B to be securely attached to an upright, such as a wall portion or posts. For a purpose to be subsequently set forth, the rear wall is also provided with a perforation 37 located approximately at its center, as shown in Figure 4 and spaced pockets 38 shown more particularly in Figure 7. These pockets are preferably formed by having horizontally spaced slits cut in the sheet material and extending diagonally, downwardly toward each other, the sheet metal being pressed inwardly as at 39 to the lower side of each slit to produce the pockets which have openings 40 at their tops. The side walls 19 and 20 are each preferably trapezoidal in shape with its rear vertical margin 41 joined to the rear wall 18 as by being integral therewith and its horizontal lower margin 42 provided with a horizontal flange 43. The top margin 44 of each side wall slopes downwardly and forwardly from the rear margin and the front margin 45 is in obtuse angular relation to margin 44 and extends to the lower margin 42. The margins 44 and 45 are shown more particularly in Figure 2. The flanges 43 of walls 19 and 20 project toward each other and upon them may rest the flanges 24 and 25 of bottom 17 as shown in Figures 2 and 6. Beam 27 of the bottom 17 may also rest upon flanges 43 and it is preferred to spot weld, as at 46, the flanges 24 and 25 to the side walls 19 and 20, respectively.

The combination door and lid D comprises a top wall 47, a front wall 48, and side walls 49 and 50. The top wall 47 is hingedly connected, at its rear margin 51 to the flange 30, as by hinges 52, and when the combination door and lid is in a closed position, this top wall preferably rests upon the top margins 44 of the side walls 19 and 20 in a manner obvious from an inspection of Figure 2. The top wall 47 is also preferably provided with a trough-like flange 53 which extends beneath the downwardly extending flange 31 of rear wall 18 when the combination door and lid is in a closed position. Thus, any water entering between the upper margin 51 of top wall 47, and flange 30 will be caught in the trough and will flow toward one or both walls 19 and 20 of the cabinet body B. The front wall 48 may be provided with upper and lower vent louvers 54 and 55 as shown in Figures 2 and 3, so as to permit a circulation of air in the cabinet. The side walls 49 and 50 are preferably each of obtuse-angled triangular shape with the obtuse angle 56 at the upper front portion of the combination door and lid, whereby the top wall 47 slopes downwardly and forwardly in order that most of the rain water, melting snow and ice, and products of condensation will flow off the top wall 47. This construction of combination door and lid is very sturdy, yet comparatively light in weight, and is not likely to be damaged by wind forces, even when in an open position, indicated by dotted lines in Figure 2 because the obtuse-angled triangular side walls brace the top and front walls 47 and 48. It is to be noted that the side walls 49 and 50 overlap the outer faces of side walls 19 and 20 thus further strengthening the cabinet, especially when the combination door and lid D is in a closed position and snow or ice is likely to accumulate on the top wall 47 thereof. If desired, the side walls 19 and 20 may be provided with perforations 57, through either of which the service line G may extend, if it is not desired to bring same out of the cabinet through the floor 21. In the example shown, the front wall 48 is provided with a handle 58 to facilitate raising and lowering of same. A padlock 59, associated with a loop 60, rigid with front wall 48, and a pivoted hasp 61 secured to horizontal flange 26 may be provided to lock the cabinet in a closed position, in order to discourage tampering with the parts. A suitable pivoted brace 62 may be operatively connected to the walls 20 and 50, at the inner sides thereof, so as to hold the combination door and lid D in an open position, when such is desired, as shown in Figure 2 by means of dotted lines.

The pressure reducing regulator may be of the manifold control type, such as is shown in patent to Wolfe, 1,844,814, granted February 9, 1932, including an operating handle 63 and inlet couplings 64, the operating handle 63 permitting the consumer to draw upon either one of the tanks H to the exclusion of the other. Or, this regulator may be of any suitable type, either manually or automatically operated. An example of an automatically operated regulator is shown in my co-pending application filed September 13, 1934, Serial Number 743,916, relating to dispensing equipment for liquefied petroleum gas. The inlet couplings 64 are connected to the conduits N in the usual way. In the example shown, the regulator E is supported in and by the cabinet by means F, preferably comprising a support 65, secured to the back of the regulator, in any suitable manner, such as by screws, not shown in the drawings, the shanks of which may be accommodated in perforations 66; and a screw 67, the shank of which passes through an opening 68 in the support 65, and into the perforation 37 of rear wall 18. The support 65 is preferably of T-shape including a vertical stem portion 69 and a cross bar 70, the ends of the latter being received in pockets 38 when the support is in place. By this construction, ordinary pressure regulators may be attached to the support, which in turn may be properly located in the cabinet, as by placing the end portions of cross bar 70 in the pockets and passing the shank of screw 67 through opening 68 and into perforation 37. A self-threading screw may be used for this purpose. This is an inexpensive support and avoids the necessity of extreme care when placing the regulator since if the cabinet is primarily located in a correct position on its support, so that the upper margin of the rear wall 18 is horizontal, and the cabinet bottom in a plane at a right angle to support A, the regulator E will be correctly positioned for efficient operation.

Each tank or cylinder H preferably comprises a cylindrical body portion 71 provided with concavo-convex bottom 72 which bulges downwardly, and a similarly shaped top 73 which bulges upwardly; and the base J and handles K hereinbefore referred to. The base J is preferably annular in shape, provided with notches or openings 74 to permit warm air to circulate about and contact said downwardly bulging bottom 72 when the base is resting upon a floor such as 21; and, an inwardly rolled flange 75 at its lower margin serving as a hand grip section. By way of example, this base may be formed from a ring of sheet metal, provided with the notches 74 open to its upper margin, the base being secured to the bottom 72 of the tank, as by welding indicated at 76. It is preferred to locate the handles K on the top 73 inwardly of the circumferential plane of cylindrical body portions 71, whereby the tank or cylinder may be rolled over the ground without the handles K, or the base J interfering with such rolling action. When it is desired to lift or carry the cylinder, a person may grasp one handle and the base J, or both handles,—whichever may be most convenient.

Figure 11:
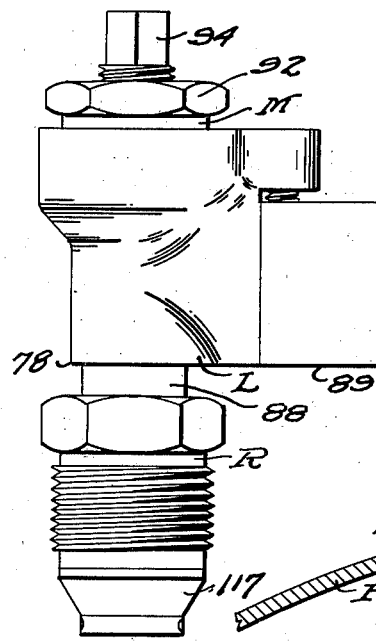
Figure 11 is a view in side elevation of one form of control unit.
Figure 12:
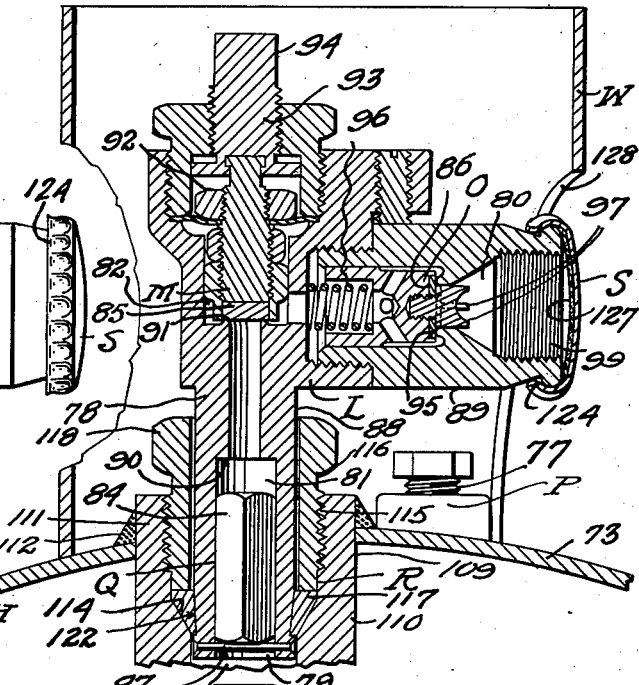
Figure 12 is a central vertical sectional view through the control unit shown in Figure 11 and its relationship to the tank or cylinder and protecting sleeve.
Figure 13:
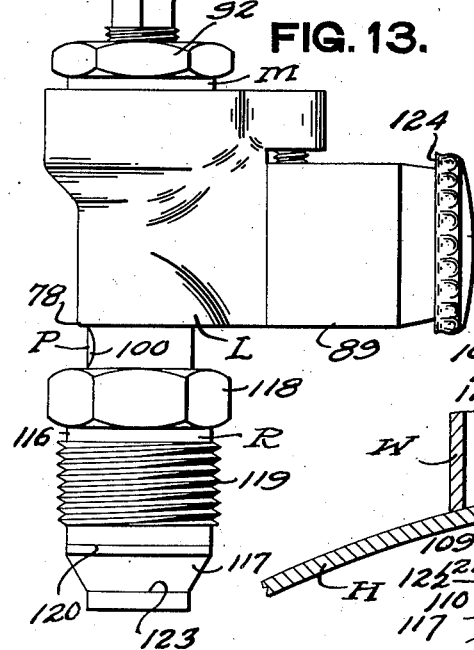
Figure 13 is a modified form of control unit.
Figure 14:
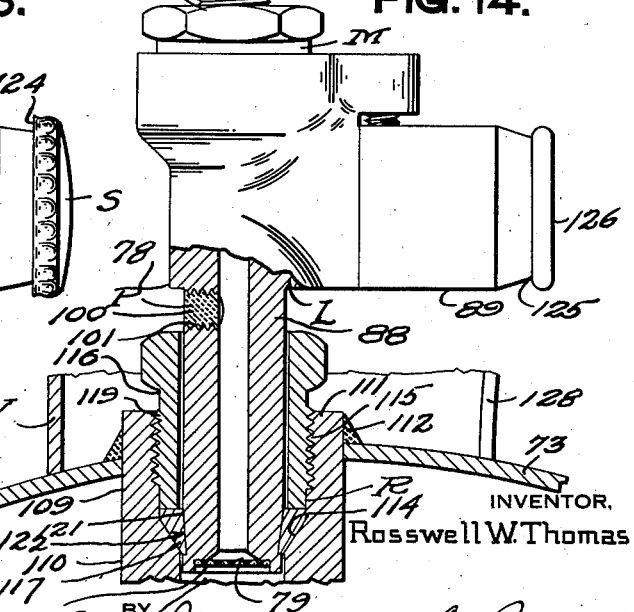
Figure 14 is a view partly in elevation and partly in vertical section of the form of control unit shown in Figure 13, attached to the tank or cylinder.

The preferred type of control unit is shown more in detail in Figures 11 and 12. It contemplates the provision of a fusible plug device 77 carried by the cylinder H preferably adjacent the crown portion of head 73 so that it may be in the zone protected by sleeve W. This form of control unit may differ from those shown in Figures 13–16 in that it includes an excess flow check device Q. More specifically, the control unit comprises a body 78 which may be detachably secured to the cylinder H by a union or swivel type base R, the body provided with an inlet port 79 and an outlet port 80, and valve chambers 81, 82 and 83 between the ports 79 and 80; a slug 84 in chamber 81; a valve proper 85 in chamber 82, and a valve proper 86 in chamber 83; and a stop 87 for slug 84 to rest upon. The body 78 has a hollow cylindrical depending stem 88 in which a chamber 81 is located, and a laterally extending coupling projection 89 in which valve chamber 83 is located. The chamber 81 has a downwardly facing seat 90 which the slug 84 may engage when carried along with rapidly moving fluid in the chamber 81, the seating of the slug being imperfect to permit a slow leakage through the passageway in order to permit the slug to drop, due to the force of gravity, or otherwise, when the pressure in the tank, and the passageway through the control device is substantially equalized. As a typical example, the slug may be made from a piece of $\frac{7}{16}$ inch square brass stock, approximately 1¾ inches long, to move in a chamber having a diameter of substantially ⅞ inch to give easy fit and to permit ready reciprocation of the slug. The upper end of the slug need not be in a plane at a right angle to the axis of the slug, but may be slanted slightly so that there will be an average leak of about 2 cubic feet per hour at 150 pounds pressure of liquefied petroleum gas in the cylinder H. Normally the slug rests upon the stop 87, as shown in Figure 12, however, in the event the body 78 of the control unit breaks at the upper portion of stem 88, the slug will be carried forward by the outrushing vapor or fluid, and but very little will escape because of the high pressure within the cylinder as compared with atmospheric pressure. Likewise, if the conduit N becomes ruptured or some of the mechanism forming a part of the apparatus becomes damaged so that the vapor or other fluid in the cylinder would ordinarily find rapid egress, the slug 84 will check rapid flow. Valve chamber 82, in the example shown, is provided with an upwardly facing valve seat 91 for valve proper 85, which latter may be moved toward and from valve seat 91 by mechanism 92, including an operating stem 93, having a polygonal head 94 for receiving a wrench, wheel, or other device, not shown in the drawings, whereby the stem 93 may be rotated. The mechanism 92 is preferably altho not necessarily of the type free from packing, springs and other similar parts which sometimes become unreliable and inefficient in use. An approved type of mechanism is shown in patent to Bastian, 1,662,291, March 13, 1928, relating to valves, so that a detailed description of mechanism 92 is unnecessary, since its particular construction forms no part of the present invention. Valve chamber 83 is provided in the coupling projection 89 of body 78 and has an inwardly facing seat 85 for valve proper 86, which latter is normally urged to a seating position by a spring 96 but may be unseated by an element acting upon fingers 97 movable with valve proper 86. The details of construction of this leakage prevention valve form no part of the present invention and are described fully in patent to Endacott, 1,977,268, October 16, 1934, relating to Dispensing equipment for compressed gas and wherein is shown an arrangement whereby a coupling such as that here shown at 98 on conduit N, having screw threaded engagement with threads 99 in outlet port 80 may open a valve such as this leakage prevention valve O when the coupling 98 is turned tight. It may, however, be pointed out in the forms of control units herein disclosed, the manually operable valve stem 93 normally points upwardly, and port 80 opens laterally so that even if the cap or seal S be omitted, foreign matter is not likely to accumulate in port 80 and interfere with operation of the leakage prevention valve O. This is in contradistinction to what is shown in the aforesaid patent, 1,977,268, where the outlet port opens upwardly.

The forms of control units shown in Figures 13–16 differ mainly from the form shown in Figures 11 and 12, in that the stem 88 of the former is not provided with a chamber like that shown at 81 in Figures 11 and 12 since the safety device P is, in the form shown in Figures 13–16, carried by the control unit L. Referring more particularly to the form shown in Figures 13–14, the safety device P is in the form of a fuse plug 100, which melts at approximately 165° F. It may be held in place by solidifying in a screw threaded bore 101 extending radially through stem 88. If desired, a screen 102 may be provided adjacent the lower end of inlet port 79, to prevent foreign matter entering the chamber of manually operable valve M. It is of course understood that a frangible disc may be used in place of the fuse plug if desired.

Figure 15:
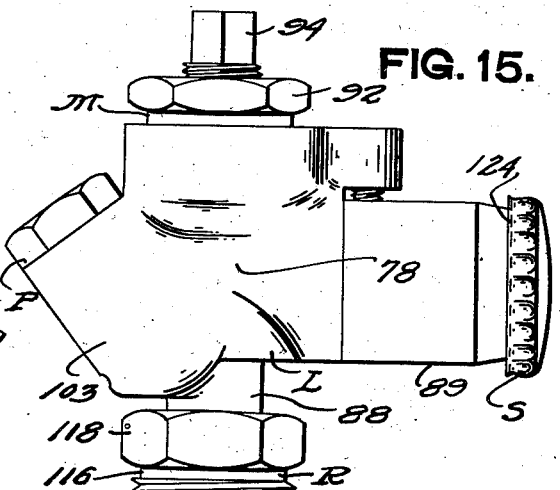
Figure 15 is a side view of a further modified form of control unit.
Figure 16:
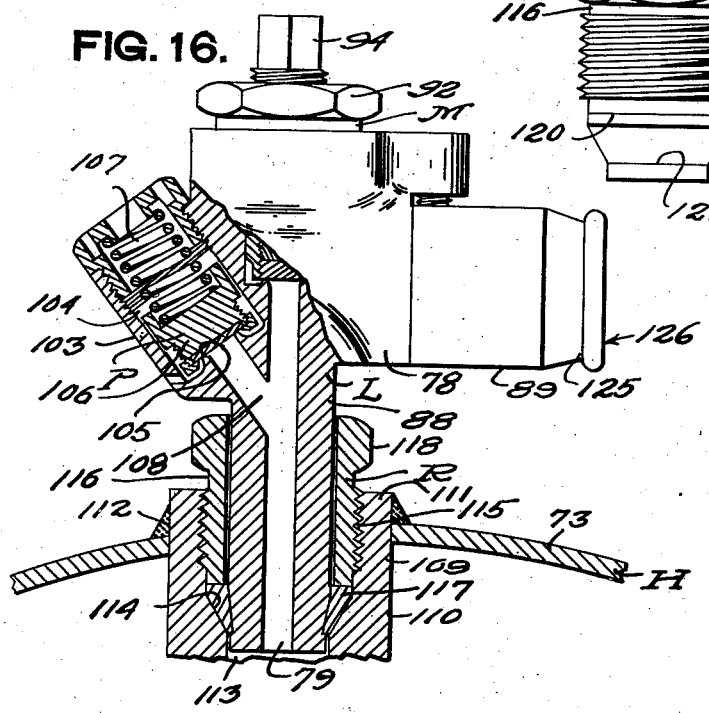
Figure 16 is a view partly in vertical section and partly in side elevation of the control unit shown in Figure 15.

The modification shown in Figures 15 and 16 provides an enlargement 103 laterally of the juncture between stem 88 and the main body 78, containing a valve chamber 104, having an outwardly facing valve seat 105, for valve proper 106, which is normally urged to a seated position by spring 107. A port 108 leads from the inlet port 79 to the valve chamber 104. Thus a high pressure, spring loaded relief or safety device may be provided, directly carried by the control unit L avoiding the necessity of a safety device, such as that shown at 77, carried directly by the tank head 73.

The union or swivel base R includes an outlet sleeve 109 having relatively thick walls as compared with the cylinder walls, preferably disposed with its major portion 110 inside the tank and its minor portion 111 exteriorly of the tank where it may be welded as at 112, to the tank head 73, preferably to one side of the vertical axis of the tank. The sleeve 109 has a vent or passageway 113 therethrough in which is an outwardly facing valve seat 114 and screw threads 115 leading from its upper end. The base R also includes a sleeve nut 116 encircling stem 88 and a ring 117 of deformable material, such as copper, carried by stem 88 and shaped to contact seat 114. Nut 116 has a wrench head 118, screw threads 119 for engagement with the threads 115, and an abutment face 120 for engagement with the top of ring 117. This ring is preferably accommodated in a circumferential groove 121 having a seating surface 122 tapering inwardly from the outer surface of the stem toward the inner end of the stem and terminating in an annular shoulder 123. After the sleeve nut 116 has been placed on stem 88, the ring 117 may be crimped to extend into groove 121 thereby preventing ready detachment of the nut 116 from the stem, yet permitting the ring to be forced into intimate contact with the seats 114 and 122 and the shoulder 123, by turning the nut tight in outlet sleeve 109. By reference to Figure 12, it will be observed that the excess flow check valve Q is in the zone surrounded by the outlet sleeve 109. By making this sleeve of material with a relatively thick wall the valve Q is in a protected position, and the control unit L is not likely to break off at a point which will injure the excess flow check valve, if the control unit be subjected to an unusual force, tending to break the stem 88.

In order that the extension 89 may accommodate the cap or seal S of a character having a crimped flange 124, it is provided with a circumferential groove 125 and a seating surface 126, such as may be found on an ordinary beverage bottle, whereby a portion of the crimped flange 124 may be forced into groove 125 in the well known manner. Inside the cap or seal S may be provided a packing disc 127 which engages the seat 126. This cap or seal may be made of material sufficiently strong to resist passage of fluid from the cylinder H through outlet port 80 at, or even greater than the pressure which normally prevails in the cylinder, so that it assists the leakage prevention valve O in preventing loss of gas or vapor while the cylinder is in storage, or during transportation, or the seal or cap may be of material of such gauge that it will not resist such a high pressure, but will be blown from the extension 89 if there is leakage past the various valves of the control unit. A cap or seal of the character described may be readily removed by use of a tool, such as an ordinary bottle opener, or may be constructed so as to require a special tool for its removal.

As to protecting sleeve W, it is preferably made with an inverted V-shaped notch or hole 128 open at its bottom margin 129 and with the notch or hole rounded as at 130 to conform somewhat to the shape of the upper portion of cap S or extension 89. The sleeve may be welded as at 131 to the head 73 co-axial therewith. The notch or hole 128 is made wide enough at its base 132, to permit the entrance and swinging of a wrench 133, shown in Figure 10, for engagement with head 118 to operate sleeve nut 116. This notch or hole 128 also permits water and other foreign matter finding its way into the sleeve, to flow or move therefrom. While the notch or hole is made large enough to accommodate a tool, not shown in the drawings, for removal of the cap or seal S, such does not weaken the protecting sleeve since the greater portion of its lower margin may be welded to the cylinder L. The sleeve is of course open at its top, so that access may be had to the operating stem 93 of valve M and for inspection of parts of the control unit. By mounting the control unit L with its supporting stem 88 to one side of the axis of protecting sleeve W, as shown more particularly by reference to Figure 10, the control unit cannot be rotated about its axis since the extension 89 will contact the interior wall of the protecting sleeve after slight circumferential movement of the control unit about its vertical axis. This avoids likelihood of an inquisitive person damaging the ring 117 by twisting of the control unit about its mounting.

The pressure relief valve X forms no important part of the invention. It is connected to the regulator E in any suitable manner, such as by pipe 134, as illustrated in Figure 1. There also is shown a wrench 135 which may be used to operate couplings 98, and to actuate valve stem 93. This wrench may be secured to some part of the apparatus, such as the pipe 134, by a chain 136.

As to operation of the equipment in practice it has been found best to provide two tanks or cylinders H, one of which is drawn upon for supplying gas to the service line G, while the other is held in reserve. This may be accomplished by use of a manifold regulator including an operating handle 63 whereby valve mechanism in the regulator is operated to open communication between the regulator and one of the conduits N while closing off communication between the regulator and the other conduit N. A very satisfactory arrangement is to use an automatic changeover device of the character disclosed in the aforesaid application, Serial Number 743,916.

Initially, in the example shown two filled tanks or cylinders will be placed in the cabinet and connected to the pressure reducing regulator and the mechanism of the regulator set to draw upon one of the cylinders. When the supply in that particular cylinder is exhausted, the attendant, in the example shown, may change over to the reserve cylinder by operation of handle 63, and detach the empty cylinder from the equipment so as to be in readiness to transport same to a store or service station as when on some other errand in the locality where the store or service station is located. Usually such trips are made with more or less regularity and there will be, in most instances, a sufficient supply of liquefied petroleum gas in the active cylinder to meet requirements long after the empty cylinder has been replaced.

If the equipment is provided with a control unit L such as shown in Figures 11 and 12 and the regulator E should fail to function, the conduit N becomes ruptured or the major portion of the control unit be broken off, the excess flow check device Q will operate to prevent rapid exit of vapor from the cylinder.

The cabinet B is so made as to not occupy much space, all parts of the equipment being compactly arranged as may be observed by reference to Figures 1 and 2. The combination door and lid D excludes water, snow and ice, when closed, yet when opened, permits operation of the handle 63 associated with the regulator E and little effort is required to place or remove one or both of the cylinders H since there is no obstruction over which same must be lifted relative to the floor 21.

What is claimed is:

1. In combination, a tank for liquefied petroleum gas under high pressure, provided with an outlet vent having screw threads leading from its outer end and an outwardly facing seat inwardly of the screw threads, a control unit comprising a body provided with a reduced hollow cylindrical stem extending into said vent, the stem provided with a circumferential groove with a seating surface tapering inwardly from its outer surface toward the inner end of the stem and terminating at an outwardly facing annular shoulder, a ring of deformable material crimped to extend into said groove and contacting the seating surface and shoulder of the steam, and a sleeve nut surrounding and free on said stem between said control unit body and ring, in screw threaded engagement with the threads of said vent opening and contacting said ring to force the ring into intimate contact with the seat of the vent opening, and the seating surface and shoulder of said stem.

2. In combination, a tank for liquefied petroleum gas under high pressure, provided with an outlet vent having screw threads leading from its outer end and an outwardly facing seat inwardly of said screw threads, a control unit comprising a body provided with a reduced hollow cylindrical stem extending into said vent, the stem provided with a circumferential groove, a ring of deformable material crimped to extend into said groove, and a sleeve nut surrounding and free on said stem between said control unit body and ring, in screw threaded engagement with threads of said vent opening and contacting said ring to force the ring into intimate contact with the seat of the vent opening.

3. In combination, a tank for liquefied petroleum gas under high pressure, provided with an outlet sleeve having relatively thick walls rigidly secured to the tank walls, with the major portion of the sleeve inside the tank, a control unit provided with a hollow cylindrical stem extending into said major portion of the sleeve and detachably secured to said sleeve, and an excess flow check device in said stem in the zone thereof surrounded by said outlet sleeve.

4. In combination, a tank for liquefied petroleum gas under high pressure, including an outlet sleeve, a unit for control of egress of fluid from the tank, including a hollow stem extending into said sleeve, a coupling including a sleeve nut surrounding said stem and in screw threaded engagement with said sleeve for detachably securing said unit to the tank, and an excess flow check device carried by said control unit in the zone thereof surrounded by said sleeve and sleeve nut.

5. In customer's equipment for the storage and utilization of liquefied petroleum gas, the combination of a tank, a control unit for exit of fluid from the tank comprising a body portion provided with an outlet port, an inlet port in communication with the tank chamber, and a plurality of valve chambers between and in communication with said ports, an automatically operated leakage prevention valve in the valve chamber nearest the outlet port, an automatically operable excess flow check device in the valve chamber nearest the inlet port, and a manually operable valve in the valve chamber intermediate said leakage prevention valve and excess flow check device.

6. In customer's equipment for the storage and utilization of liquefied petroleum gas, the combination of a tank, a control unit for exit of fluid from the tank comprising a body portion provided with an outlet port, an inlet port in communication with the tank chamber, and a plurality of valve chambers between and in communication with said ports, an automatically operable leakage prevention valve in the valve chamber nearest the outlet port, a manually operable valve in the valve chamber nearest the inlet port, and a high pressure relief device operatively connected to said body portion and communicating with the inlet port to permit escape of fluid under high pressure from said inlet port when the pressure in the tank becomes abnormal.

7. In customer's equipment for the storage and utilization of liquefied petroleum gas, the combination of a tank, a control unit for exit of fluid from the tank comprising a body portion provided with an outlet port, and inlet port in communication with the tank chamber, a valve chamber intermediate said ports and an annular flange about said outlet port, a valve in said valve chamber for control of vapor through said ports, and a removable fluid tight cap over said outlet port detachably connected to said flange.

8. In combination with a tank for fluid under pressure, a sleeve having its one end secured to the tank at the exterior wall thereof with the axis of the sleeve normal to the tank wall and its other end open, said sleeve provided with a wrench receiving opening in its side wall, a unit for control of exit of fluid from the tank located in the zone surrounded by said sleeve and operable through the open end of the sleeve, and a union coupling detachably coupling said unit to the tank including a wrench receiving part in a plane common to said wrench receiving opening.

9. In combination with a tank for fluid under pressure, a sleeve having one end secured to the tank at the exterior wall thereof with the axis of the sleeve normal to the tank wall and its other end open, said sleeve provided with a wrench receiving opening in its side wall, a unit for control of exit of fluid from the tank located in the zone surrounded by said sleeve, and comprising a body portion, a laterally projecting coupling extension and a handle operable through the open end of said sleeve, and a union coupling detachably connecting said body portion of the control unit to the tank in the zone surrounded by said sleeve, near the wall of the sleeve opposite to said wrench receiving opening and with the said coupling extension pointing toward said opening, said union coupling including a wrench receiving part in a plane common to said wrench receiving opening.

ROSSWELL W. THOMAS.